US007275122B2

(12) United States Patent
Wright et al.

(10) Patent No.: US 7,275,122 B2
(45) Date of Patent: *Sep. 25, 2007

(54) METHOD AND SYSTEM FOR MAINTAINING A DESIRED SERVICE LEVEL FOR A PROCESSOR RECEIVING EXCESSIVE INTERRUPTS

(75) Inventors: Randall F. Wright, Fort Collins, CO (US); Jerry A. Hoemann, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/117,881

(22) Filed: Apr. 28, 2005

(65) Prior Publication Data

US 2005/0246465 A1 Nov. 3, 2005

Related U.S. Application Data

(60) Provisional application No. 60/566,305, filed on Apr. 28, 2004.

(51) Int. Cl.
*G06F 13/24* (2006.01)
*G06F 9/46* (2006.01)

(52) U.S. Cl. .................. 710/267; 710/260; 718/102

(58) Field of Classification Search ................ 710/260, 710/267, 263–266; 718/102–105, 107, 108
See application file for complete search history.

(56) References Cited

U.S. PATENT DOCUMENTS

| 6,105,102 | A | * | 8/2000 | Williams et al. | ............ | 710/261 |
| 6,633,942 | B1 | * | 10/2003 | Balasubramanian | ........ | 710/264 |
| 6,662,297 | B1 | * | 12/2003 | Boom et al. | ................ | 710/264 |
| 6,697,870 | B1 | * | 2/2004 | Cafarelli et al. | ............ | 709/233 |

OTHER PUBLICATIONS

Van Jacobson, et al., Congestion Avoidance and Control, Nov. 1988, pp. 1-25.

* cited by examiner

*Primary Examiner*—Glenn A. Auve
*Assistant Examiner*—Trisha Vu (57) ABSTRACT

A method and system for maintaining a desired service level for a processor receiving excessive interrupts. The method includes the operation of defining an interrupt processing period during which interrupts will be measured for a processor. The amounts of time spent by the processor during the interrupt processing period in interrupt context can be measured. Another operation is detecting an interrupt storm occurring for the processor based on the amounts of time spent by the processor in interrupt context. The interrupts received by the processor can then be restricted for a period of the processor's total processing time when an interrupt storm has been detected.

36 Claims, 4 Drawing Sheets

METHOD AND SYSTEM FOR MAINTAINING A DESIRED SERVICE LEVEL FOR A PROCESSOR RECEIVING EXCESSIVE INTERRUPTS

CROSS-REFERENCE TO RELATED APPLICATIONS AND CLAIM OF PRIORITY

Priority of U.S. (Provisional) patent application Ser. No. 60/566,305 filed on Apr. 28, 2004 is claimed.

FIELD OF THE INVENTION

The present invention relates generally to maintaining a desired service level for a process receiving excessive interrupts.

BACKGROUND

A multiprocessor system may face a critical situation when one or more of its processors spends an inordinate amount of time handling external interrupts. An interrupt storm on a processor or in an operating system kernel is generally defined as the condition where the processor spends such a large amount of its processing time in an interrupt context that processes or lower priority interrupts are blocked from normal execution. Two other indicators of this situation are when the processor receives multiple contiguous interrupts or a few interrupts each of which spends an extended amount of time being processed.

In the past the mindset has been that when a processor was spending an inordinate amount of its processing power on servicing interrupts, then a good design choice would be to substitute a more powerful processor for the slower processor. Because processors have been steadily increasing in processing power and relatively decreasing in cost, this problem of excessive interrupts has been solved by applying more computing power. Unfortunately, increasing the processing power often increases the cost of a system by adding another processor to the system or including a more powerful and costly processor. Another option has been to prioritize incoming interrupts so that the most important interrupts are processed first. Regardless of the amount of increased processing power available, there may be situations where the number of interrupts can overwhelm even the fastest processor.

An interrupt storm may happen due to an excessive amount of device interrupts from one or more devices or due to an error condition in a device. I/O (Input/Output) interrupts can present a particular problem to an operating system kernel because of the longer time period required to service such interrupts. Even with interrupts that take a shorter time to process, a large number of interrupts can block out processes that would otherwise be executed by the kernel.

An example of a situation that can cause an interrupt storm is a network router that is configured incorrectly or may be having a hardware failure. If the network router is receiving packets from one or more networks and then incorrectly sending all or a large part of the packets back to a single network, then the receiving network server will be overwhelmed by interrupts for the network packets. Particularly, a network card for the network server will generate an overwhelming amount of I/O interrupts to the server processor and its operating system kernel.

In a similar situation, a network router may be misconfigured in a loop back situation where the network packets sent to the router by a server are bounced directly back to the network or server that sent the packets. This can also cause an interrupt storm. Further, a denial of service attack or flood of communication packets illustrates other situations where an interrupt storm may take place. Of course, there may simply be peripheral devices or network components that require a significant amount of interrupt attention or I/O.

Whatever the reason, such a situation can result in other important processes being blocked from executing on the processor. If the blocked process in question is a heartbeat timer or any time sensitive process, the operating system or diagnostic software may be misled into flagging an error condition on the system, which in turn may activate unnecessary correction triggers. In some situations, specialized diagnostic software may be executing on the computer and when the diagnostic software does not receive the appropriate heartbeat and other processing signals, then the diagnostic software may reboot the server because the server appears to the diagnostic software to have crashed. Thus, an interrupt storm may result in the constant rebooting of the server if the interrupt storm cannot be accurately detected and properly dealt with.

SUMMARY OF THE INVENTION

The invention provides a method and system for maintaining a desired service level for a processor receiving excessive interrupts. The method includes the operation of defining an interrupt processing period during which interrupts will be measured for a processor. The amounts of time spent by the processor during the interrupt processing period in interrupt context can be measured. Another operation is detecting an interrupt storm occurring for the processor based on the amounts of time spent by the processor in interrupt context. The interrupts received by the processor can then be restricted for a period of the processor's total processing time when an interrupt storm has been detected.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention provides a method and system for maintaining a desired service level for a processor receiving excessive interrupts in accordance with an embodiment of the present invention. Particularly, the present invention helps overcome the problem where a processor is inundated because processes are trapped behind a continuous flood of interrupts and/or lengthy interrupts. A processor that is overwhelmed with interrupts can allow the interrupts to consume processing cycles to the point that the system's processes or applications will appear to have crashed or hung up. As mentioned previously, this situation can invoke undesirable failovers in hardware and software diagnostic tools. An overloaded processor can also result in other symptomatic problems, such as a slowly executing operating system or applications.

It is valuable to be able to detect interrupt storms because then corrective action can be taken or notification can be provided to the responsible personnel. Accordingly, the processor or operating system kernel of the present invention is enabled to predictably detect an interrupt storm for a processor and then take corrective action to allocate processing time between system processes, application processes and incoming interrupts.

An interrupt storm on a processor or for an operating system kernel is generally defined in this invention as the condition where the processor spends more than a specified percentage of its processing time in interrupt context. In the past, the detection of interrupt storms has not been done because if a processor appeared to be to slow for unknown reasons (i.e., undetected interrupt problems), then a more powerful processor was purchased or the next generation of processors quickly replaced the slower processors. However, processors in the past did not generally have the advanced self-diagnostic capabilities that are now available. These self-diagnostic capabilities are desirable because they provide a high degree of reliability for mission critical systems. Accordingly, current processors have self-correcting software that endeavors to reboot the processor if it appears as though the processor has crashed when the processor is inundated by interrupts.

Figure 1:
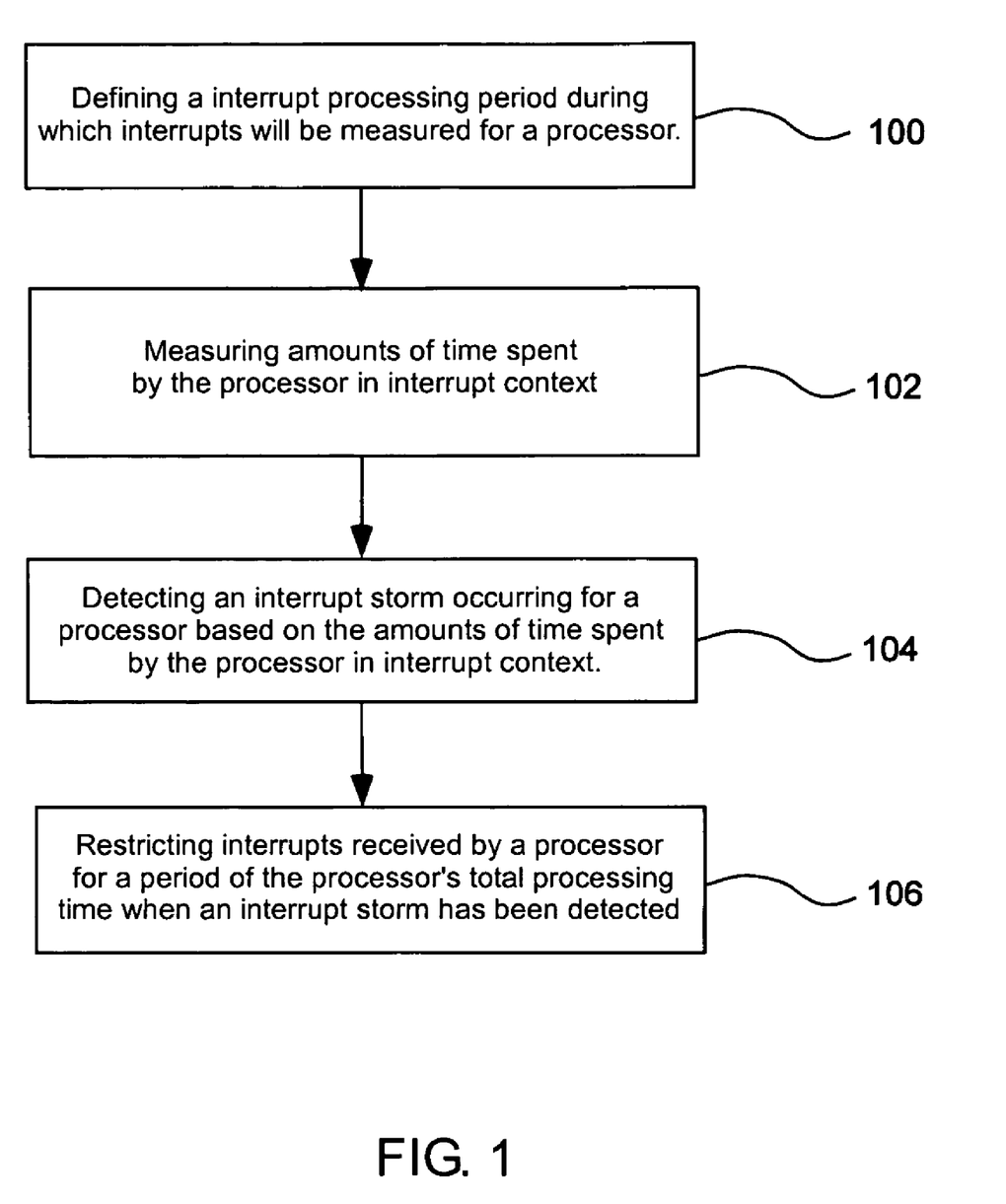
FIG. 1 is a flow chart illustrating a method for maintaining a desired service level for a processor receiving excessive interrupts in accordance with an embodiment of the present invention.

FIG. 1 illustrates that the method of the present invention includes the operation of defining an interrupt processing period during which the measuring of interrupts for a processor can take place, as in block 100. In one embodiment, the present invention can monitor the time periods a processor spends in interrupt context handling interrupts by establishing a constantly moving window of processor activity. For example, the window of activity may be 10 milliseconds.

The amounts of time being spent by the processor in an interrupt context during the interrupt processing period can then be measured, as in block 102. A further operation in the method is to detect an interrupt storm occurring for a processor. The detection can be based on the amounts of time spent by the processor in the interrupt context during the interrupt processing period, as in block 104. An interrupt storm condition may be determined by a periodic calculation of average time spent in interrupt context and then comparing the calculated value with a user tunable threshold. In further embodiments of the invention, a weighted average or a decaying average can be used for the average calculation. Alternatively, the detection can be based on a high level of processing within a given window, detecting "long interrupt contexts" without averaging, or by using an external network device that monitors incoming interrupts from certain classes of devices. Alternatively, an interrupt storm condition for a processor may be determined by using external packet detection which provides information to the kernel to detect an interrupt storm.

Once the interrupt storm has been detected, the interrupts received by a processor can be restricted for a period of the processor's total processing time when an interrupt storm has been detected, as in block 106. The time when the interrupts are restricted can be defined as a strobing period or interval because the period when processor is limited from receiving interrupts will "strobe" on when a storm is detected.

In an alternative embodiment of the invention, a system administrator or user can be notified through a console, system log messages, email messages or instant messaging that an interrupt storm condition has been detected. Other corrective action can take place as defined by a system administrator or within corrective software on the processing system. For example, the blocked processes may be moved to another processor or filtering of specific types of network packets may occur.

Now that a more generic embodiment of the present invention has been described, a more detailed embodiment will be set forth. A method is illustrated for maintaining a desired service level for a processor receiving excessive interrupts in FIG. 2. The method includes the operation of defining an interrupt processing period during which interrupts will be measured for a processor, as in block 200. This interrupt processing period will generally be a window of a pre-defined number of milliseconds as described before.

Figure 2:
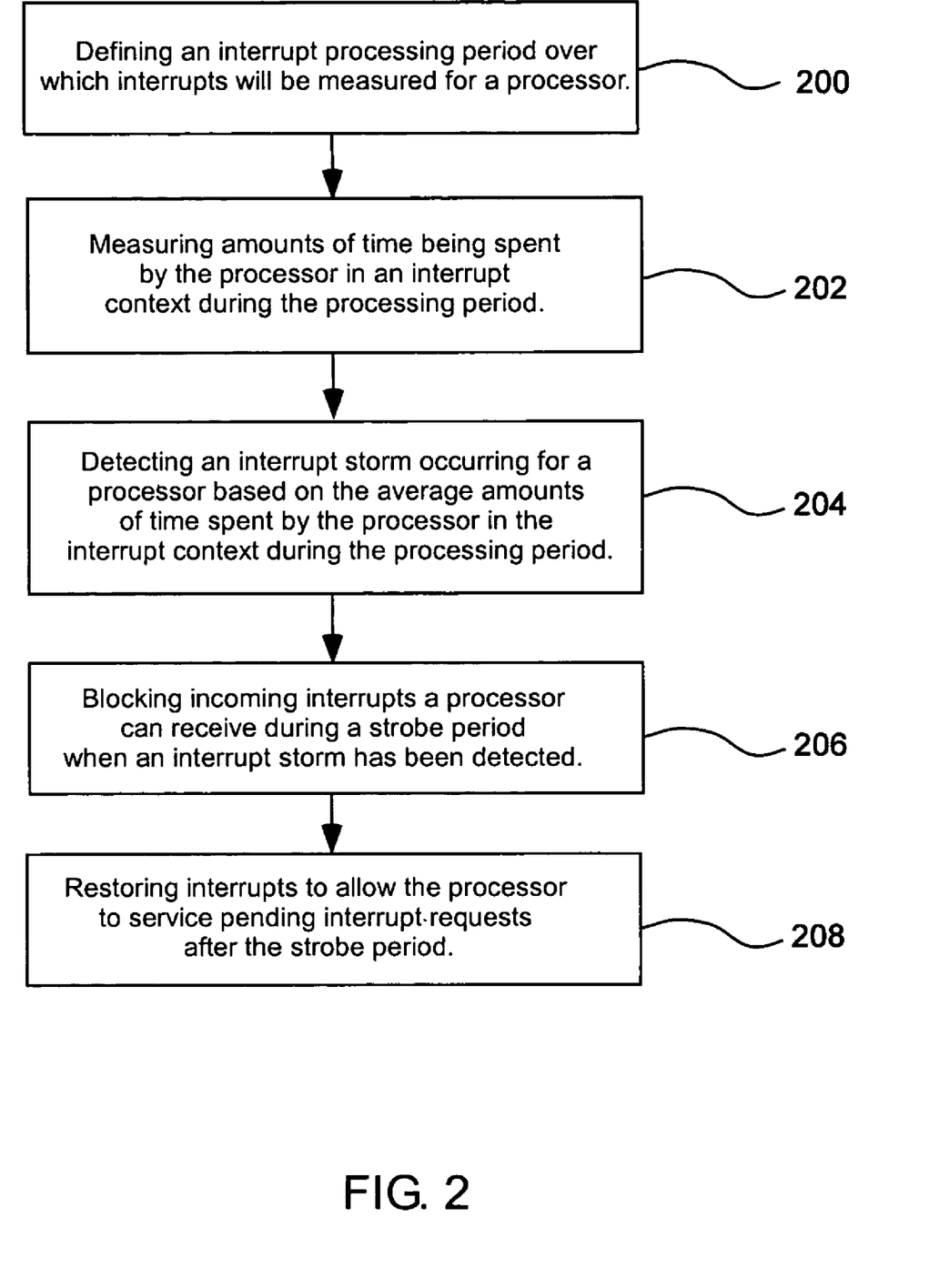
FIG. 2 is a flow chart depicting an embodiment of a method for maintaining a desired service level for a processor receiving excessive interrupts by blocking and restoring the interrupts.

A further operation is measuring amounts of time being spent by the processor in an interrupt context during the interrupt processing period as in block 202. In order for the detection to take place more accurately, it is beneficial for interrupt priorities to be taken into account. The reason for this is when the time spent by the processor in interrupt context is measured using interrupt routines with the same priority as device interrupts, this can cause the time spent in the interrupt context to be measured incorrectly. In other words, an interrupt routine for measuring time in interrupt context that has the same priority as device level interrupts may not even get called until an interrupt storm has entirely passed. For example, measuring the time spent in an Interrupt Service Routine (SIR) may not be enough if the SIR takes several milliseconds and/or two or three extended periods are placed back to back.

The present invention can measure the amounts of time being spent by the processor in an interrupt context by applying interrupt priorities in a manner that comparatively accurate detection takes place. In order to overcome the obstacle described, a higher priority clock level interrupt can be used to measure the time spent in interrupt context for the device level drivers. This "nested" interrupt configuration allows the time spent in interrupt context to be more accurately measured because the clock interrupt has a higher priority and can briefly preempt the device level interrupt when needed. In other words, the measuring metric for the interrupt storm is measured from within a base level interrupt that can be activated and nested by context switching within the device level interrupts. This method avoids the problems that would otherwise be present if the time spent in interrupt context were measured from the kernel code.

An interrupt storm occurring for a processor can then be detected based on the average amounts of time spent by the processor in the interrupt context during the interrupt processing period, as in block 204. In one embodiment, a smoothed average can be calculated using just addition, subtraction and bit shifting. In addition, the average may also be scaled. These operations are comparatively efficient and do not affect the overall operating system kernel load significantly. A scaled value in the interrupt critical section (ICS) can be obtained every clock tick as:

current_value=previous_value−
 (previous_value>>gain_factor)+current ICS
 time.

And a smooth average can be obtained from scaled value in ICS time as:

smooth_average=current_value>>gain_factor

The scaled value goes up when the processor spends more than the threshold time in interrupt context for several clock cycles. Under normal conditions, the scaled value remains steady with some variance and goes up under an interrupt storm condition. The value increases as the time spent in interrupt context increases. A first time detection of storm may take several clock ticks. The subsequent immediately following storm can be detected very fast as the scaled value and scaled average are already high.

A gain of 4 (i.e., value of gain_factor 2 amounts to gain of 4) has been recommended as a beneficial implementation of the present invention. Of course, any other desired gain factor can be used.

When the system has detected that an interrupt storm is occurring for a processor, then incoming interrupts that a processor would otherwise receive during a strobe period can be blocked or restricted, as in block 206. This strobing period will generally follow shortly after the detection of the interrupt storm. Following the detection of an interrupt storm, any new incoming I/O interrupts are switched off for a preset amount of time or the strobe period. In addition, the interrupts may be selectively blocked based on the type of incoming interrupt, as compared to blocking out all the interrupts completely. Blocking the interrupts allocates time to vital processes and lower priority interrupts that may need to execute on the processor. Once the strobing period has ended, then the interrupts can be restored to provide the opportunity for the processor to service pending interrupt requests after the strobe period, as in block 208.

In order to understand how strobing can be taken care of efficiently, certain details in embodiments of the invention will now be described. Preparation for strobing starts when flags are set in interrupt critical section function to represent that an interrupt storm condition exists. The interrupt strobe mechanism may almost entirely be contained within the multiprocessor interrupt handler.

For all the new I/O interrupts that occur, the external interrupt request register (EIRR) is cleared and the corresponding interrupt service routine is not called. Instead, a bit is set in a restore mask for new interrupts. Once the storm is over, the interrupt handlers corresponding to the restore mask are called, giving the interrupt handlers a chance to service any pending requests. This is done by resending the interrupts via a write to the processor's HPA register. The hardware bit mask(s) is also reset when the storm ends.

An interrupt storm condition activation is always marked to end after the strobe period. The strobe period can be statically determined, and in one embodiment of the invention is set to two clock ticks. Alternatively, the number of processes waiting in the kernel's queue can determine the strobe period and this will be described in further detail below.

An end of the storm can be implemented by means of a timeout. This timeout can invoke a function to clear the strobe interrupts. This function clears the necessary flags and sets the restore mask bits in the interrupt request register. In case the timeout is migrated to a different processor, the timeout function sends a soft interrupt to the processor in storm and the interrupt strobe clear function is called as interrupt service routine (SIR) of this soft interrupt.

The end of an interrupt storm can also be triggered from the processor's idle loop. A processor will generally execute in the idle loop of the kernel when it does not have any runnable process available. When the processor is in the idle loop, then operating system kernel knows that there are no remaining blocked processes and that interrupts can be serviced without any restrictions. Calling an end of storm from the idle loop makes the entire processor time available for interrupt processing.

After a timeout has been registered and the strobe period has ended, the interrupts can be re-enabled. The interrupts can either be enabled through the timeout function or through an idle function. In the case where the idle function finds that another storm condition has been declared, the function cancels any pending timeout function and calls the re-enablement function.

There are generally three known typical interrupt storm conditions. One is where a large number of interrupts are coming to the same processor. In this condition, an incoming interrupt bit is asserted before the processor comes out of the Interrupt Critical Section (ICS) or interrupt context. The time spent in ICS may be 100% of the processor time for several clock ticks or even a few seconds. The condition is detected as the storm contributes 100% of the processor time to the scaled value and smoothed average. Using the scaled smooth averaging, several interrupts are processed before another interrupt storm is declared.

A second storm condition is where there are a few interrupts but each Interrupt Service Routine (SIR) takes an extended period of time. In this condition, the SIR time is so large that interrupt bits are asserted before it finishes. While this is not technically a storm condition, the result is the same because the interrupts keep the processor busy in interrupt context for a long time. In this situation, just a few interrupts (in some cases only one) are processed before a storm is declared.

A third storm situation is a mix of case one and case two. The third storm condition will also spend a significant amount of time in the ICS due to a mixture of long interrupts and/or a large number of interrupts. Thus, the smooth averaging will also be able identify this condition and then activate strobing.

The time spent by the processor in interrupt context may be stored in a per processor data structure from which the scaled smooth average is calculated. As discussed, when the smoothed average is more than the given threshold stored in the data structure, a storm condition can be declared. The threshold can be loaded or calculated from a tunable variable for the interrupt percentage, which is a measure of the maximum percentage of system time a processor can be in interrupt context. The threshold at which an interrupt storm is triggered may vary depending on the server system and/or end user requirements. If desired, the present invention allows the triggering of the strobes to be totally turned off.

Brief peaks of processor time exceeding the configured value will not generally be considered to be an interrupt storm condition because they do not increase the average interrupt processing time significantly. One automated strobing method for coping with the interrupt storm is to switch off any new incoming I/O interrupts for a preset length of time. These interrupts can be switched back on again after a delay time or if the processor does not have any more processes to schedule.

One advantage of using a strobing mechanism to respond to interrupt storms is that strobing is temporary and just activated when needed. Even if there is interrupt handling for devices that generate large amounts interrupts frequently, the kernel is just blocked for certain intervals when the interrupts are not being strobed. While this does not remove the offending device, it does permit any blocked processes to continue making progress.

Figure 4:
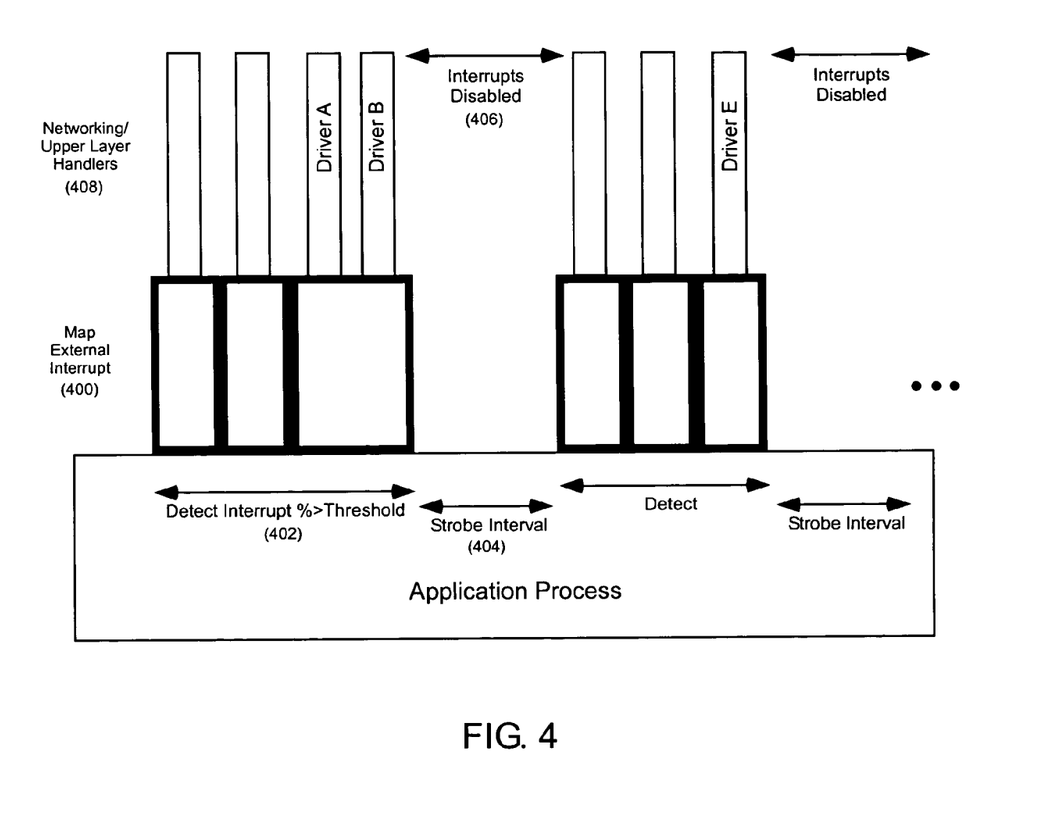
FIG. 4 is a diagram illustrating an embodiment of interrupt servicing and strobing over time.

FIG. 4 illustrates an interrupt strobing cycle. Particularly, a plurality of interrupts can be called by the mapping of external interrupts 400 and the interrupts in turn call the upper layer handlers and application drivers 408. When the interrupts are called relatively frequently, this increases the value of the interrupt storm threshold 402 and an interrupt storm condition may be entered. Then a strobe interval (404) can be activated and the interrupts will be disabled (406). Following the strobe interval, the interrupts will be enabled and the detection and strobing cycles can repeat as needed.

In one embodiment, strobing can be targeted just toward I/O interrupts. As a part of the data collection system, the hardware device or I/O interrupts are tracked. This information is used during the strobing phase, to block out incoming hardware and/or I/O interrupt bits. Even in the I/O only interrupt embodiment, storm detection uses the time spent by all interrupts in interrupt context and is not specifically targeted towards I/O interrupts. Alternatively, storm detection that is targeted toward just I/O interrupts can also be implemented.

The time spent in interrupt context is meaningful when measured independently for every processor. However, an aggregate measure for multiple processors may be used if desired. In other words, the methods for detection and strobing described in this invention can be applied to a group of processors as opposed to just one.

The measurements and averaging computations can be done in a function called each processor clock tick or every several ticks. At boot time, an initialization function can set up the measurement and averaging function(s). The strobe initiation function can also be called to register the dynamically tunable handler.

The user interface controls for the interrupt storm detection and strobing mechanism will now be discussed in further detail. A tunable variable can enable and control the interrupt storm detection and strobing mechanism. In other words,. the user can change these settings in the operating system kernel. A value representing the time spent in the interrupt control section can be modified. This value can represent the maximum percentage of total time the processor can spend in the interrupt context. If this value is zero, the interrupt storm detection is turned off. This detection threshold level can have values from 0 to 100%, and values that are closer to 100% are recommended. A value of zero may be used to turn off this functionality. A default value may also be set to 100% so that a high level of interrupt processing will take place before an interrupt storm is detected.

The tunable threshold value can be changed in the middle of storm detection or strobing. In the worst case, the tunable value may change when strobing on a processor has just begun. In this case, the effect of the tunable will be seen after a delay equal to (or less than) the strobe time.

The interrupt processing period over which the interrupts will be measured can also be user modifiable or set to a fixed time period. Accordingly, the operating system kernel can store a default value (e.g., 10 milliseconds) for the interrupt processing period and this value can be changed to range from 2 to 100 milliseconds.

Interrupt detection information can also be logged by the system. Information regarding the occurrence of interrupt detection can be logged to the system log, to the console or any other desirable storage location. The interrupt detection algorithm can be triggered every clock tick when under storm conditions. Creating an entry for every trigger is not feasible, but a useful interval for logging has been determined to be approximately one minute. In other words, a log entry can be created when an interrupt storm is first detected on a processor and will repeat after each minute has passed.

Figure 3:
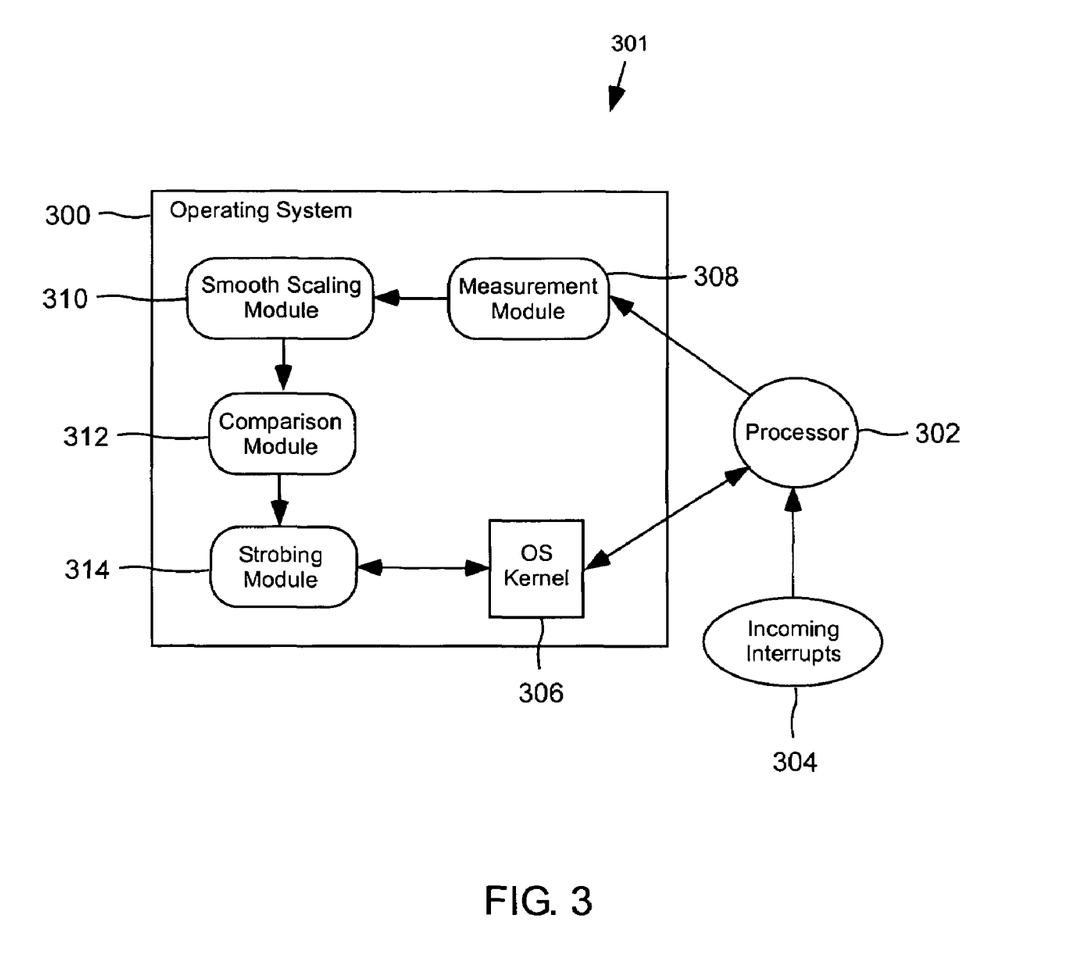
FIG. 3 is a block diagram illustrating an embodiment of a system for maintaining a desired service level for a processor receiving excessive interrupts in accordance with an embodiment of the present invention.

FIG. 3. illustrates a block diagram of a system 301 for detecting excessive interrupt processing overhead for a processor 302. An operating system kernel 306 can be configured for scheduling of processes that will execute within the operating system 300. The processor can receive executing processes from the operating system kernel and hardware interrupts. In addition, the processor can switch to interrupt context when an incoming interrupt 304 is received.

A measurement module 308 is provided to measure amounts of time being spent by the processor 302 in the interrupt context over a defined interrupt processing period. A smooth scaling module 310 can compute a smoothed average of detected amounts of time being spent in interrupt context by the processor. A comparison module 312 is provided for comparing the smoothed average received from the smoothing scaling module with a pre-determined interrupt storm threshold. This comparison can then identify when an interrupt storm is taking place because the smooth scaled value will exceed the interrupt storm threshold. A strobing module 314 can be configured to limit or restrict the interrupts a processor receives over a period of the processor's total processing time. A strobing period controlled by the strobing module can be activated when the strobing module receives a communication from the comparison module that a storm condition exists.

Strobing can be configured to last for a certain period of time before a system administrator is contacted or similar action is taken. For example, the strobing can last for half an hour up to 24 hours. This allows the system administrator to determine what length of time they would like the system to strobe before contacting responsible personnel. Alternately, strobing may not have any set time limit and may be used constantly, if desired.

The present invention provides the significant advantage that the operating system kernel can allocate time to both kernel level processing, applications, and lower priority interrupts. In the past, operating system kernels have not guaranteed processor time for kernel level processing an app processing.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for maintaining a desired service level for a processor receiving excessive interrupts, comprising the steps of:

defining processing period during which a processor will be measured;

measuring an amount of time that the processor is in interrupt context during the processing period;

detecting an interrupt storm occurring for the processor based on the amounts of time spent by the processor in interrupt context; and restricting the processing of interrupts by the processor for a predetermined amount of time when an interrupt storm has been detected.

2. A method as in claim 1, wherein the step of restricting interrupts received by the processor further comprises the step of switching off incoming I/O interrupts for a preset amount of time.

3. A method as in claim 2, wherein the step of switching off incoming I/O interrupts further comprises the step of switching the incoming I/O interrupts on after a timeout.

4. A method as in claim 2, wherein the step of switching off incoming I/O interrupts further comprises the step of switching the incoming I/O interrupts on when the processor has no further processes to schedule.

5. A method as in claim 2, wherein the step of switching off incoming I/O interrupts further comprises the step of switching the incoming I/O interrupts on when the processor is in an idle loop.

6. A method as in claim 1, wherein the step of restricting interrupts received by a processor further comprises the step of limiting a processor from receiving interrupts for a time interval after an interrupt storm has been detected.

7. A method as in claim 1, wherein the step of restricting interrupts received by a processor, further comprises the step of strobing the period when the processor is restricted from receiving interrupts.

8. A method as in claim 1, wherein the step of detecting an interrupt storm further comprises the step of detecting a high level of interrupt processing.

9. A method as in claim 8, wherein the step of detecting a high level of interrupt processing further comprises the step of detecting a peak in interrupt processing.

10. A method as in claim 8, wherein the step of detecting a high level of interrupt processing further comprises the step of detecting when the processor is in interrupt context for an extended period of time.

11. A method as in claim 1, wherein the step of detecting an interrupt storm further comprises the step of detecting a plurality of contiguous interrupt contexts which are interpreted as an interrupt storm.

12. A method as in claim 1, wherein the step of measuring amounts of time being spent by the processor in interrupt context, further comprises the step of computing a smoothed average of amounts of time being spent in interrupt context by the processor.

13. A method as in claim 12, wherein the step of detecting an interrupt storm further comprises the step of determining when an interrupt storm is occurring for a processor by comparing the smoothed average to a pre-determined interrupt storm threshold.

14. A method as in claim 13, wherein the step of determining when an interrupt storm is occurring further comprises the step of comparing the smoothed average to at least an 80% threshold of a processor's maximum processing capability.

15. A method as in claim 13, wherein the step of determining when an interrupt storm is occurring further comprises the step of comparing the smoothed average to a user definable threshold of a processor's maximum processing capability.

16. A method as in claim 15, further comprising the step of enabling the user defined threshold to be turned off.

17. A method as in claim 1, wherein the step of detecting an interrupt storm further comprises the step determining when an interrupt storm is occurring for a processor by using external packet detection which provides information to the kernel to detect an interrupt storm.

18. A method for maintaining a required service level for a processor receiving excessive interrupts, comprising the steps of:

defining a processing period during which interrupts will be measured for the processor;

measuring amounts of time being spent by the processor in an interrupt context during the processing period;

detecting an interrupt storm occurring for a processor based on the average amounts of time spent by the processor in the interrupt context during the processing period;

blocking incoming interrupts a processor can receive during a strobe period when an interrupt storm has been detected; and restoring interrupts to allow the processor to service pending interrupt requests after the strobe period.

19. A method as in claim 18, wherein the step of blocking incoming interrupts further comprises the step of clearing incoming interrupts.

20. A method as in claim 19, wherein the step of clearing incoming interrupts further comprises the step of clearing the external interrupt request register.

21. A method as in claim 18, further comprising the step of clearing a strobe state after the strobe period has ended.

22. A method as in claim 21, further comprising the step of clearing a storm condition after the strobe period has ended.

23. A method as in claim 22, wherein the step of clearing a storm condition further comprises the step of clearing the storm condition by clearing storm flags when a storm clearing timeout is activated.

24. A method as in claim 23, wherein the step of clearing of a storm condition releases the entire processor time available for interrupt processing.

25. A system for maintaining a desired service level for a processing system receiving excessive interrupts, comprising:

an operating system kernel configured for queuing and scheduling of processes;

a processor configured for executing processes received from the operating system kernel and receiving interrupts, wherein the processor is further configured to enter an interrupt context;

a measurement module configured for detecting amounts of time being spent by the processor in interrupt context over a defined processing period;

a smooth scaling module configured for computing a smoothed average of amounts of time being spent in interrupt context by the processor;

a comparison module configured to compare the smoothed average with a pre-determined interrupt storm threshold in order to identify when an interrupt storm is taking place; and a strobing module configured to limit a processor from receiving interrupts for a period of time when an interrupt storm has been detected.

26. A system as in claim 25, wherein the strobing module is configured to switch off incoming I/O interrupts for a preset amount of time during an interrupt storm.

27. A system as in claim 25, wherein the strobing module is configured to switch on the incoming I/O interrupts on after a timeout is received for a strobing period.

28. A system as in claim 25, wherein the strobing module is configured to switch on the incoming I/O interrupts on when the processor has no further processes to schedule.

29. A system as in claim 25, wherein the strobing module is configured to limit a processor from receiving interrupts at intermittent intervals when an interrupt storm has been detected.

30. A system as in claim 25, further comprising a per processor data structure for storing strobing and interrupt storm information.

31. A system as in claim 25, wherein the pre-determined interrupt storm threshold is dynamically definable.

32. A system as in claim 25, wherein the pre-determined interrupt storm threshold is at least 80% of the processor's total processing capability.

33. A system as in claim 25, wherein the smooth scaling module calculates a smoothed average by computing a time based weighted average of the time spent in interrupt context.

34. A system as in claim 25, wherein the smooth scaling module calculates a smoothed average by computing a scaled decaying average of the time spent in interrupt context.

35. A system for maintaining a desired service level for a processing system receiving excessive interrupts, comprising:

an operating system kernel means for queuing and scheduling of processes;

a processor means for executing processes received from the operating system kernel means and receiving interrupts, wherein the processor means is further configured to enter an interrupt context;

a measurement means for detecting amounts of time being spent by the processor means in interrupt context over a defined processing period;

a smooth scaling means for computing a smoothed average of amounts of time being spent in interrupt context by the processor means;

a comparison means for comparing the smoothed average with a pre-determined interrupt storm threshold in order to identify when an interrupt storm is taking place; and a strobing means for limiting a processor from receiving interrupts for a period of time when an interrupt storm has been detected.

36. An article of manufacture, comprising:

a computer usable medium having computer readable program code embodied therein for maintaining a desired service level for a processor receiving excessive interrupts, the computer readable program code means in the article of manufacture comprising:

computer readable program code configured to define a processing period during which a processor will be measured;

computer readable program code configured to measure an amount of time that the processor is in interrupt context during the processing period;

computer readable program code configured to detect an interrupt storm occuring for a processor based on the amount of time spent by the processor in interrupt context; and computer readable program code configured to restrict the processing of interrupts by the processor for a predetermined amount of time when an interrupt storm has been detected.

* * * * *

UNITED STATES PATENT AND TRADEMARK OFFICE
CERTIFICATE OF CORRECTION

PATENT NO. : 7,275,122 B2
APPLICATION NO. : 11/117881
DATED : September 25, 2007
INVENTOR(S) : Randall F. Wright et al.

It is certified that error appears in the above-identified patent and that said Letters Patent is hereby corrected as shown below:

In column 4, line 46, delete "(SIR)" and insert -- (ISR) --, therefor.

In column 4, line 46, delete "SIR" and insert -- ISR --, therefor.

In column 6, line 8, delete "(SIR)" and insert -- (ISR) --, therefor.

In column 6, line 37, delete "(SIR)" and insert -- (ISR) --, therefor.

In column 6, line 38, delete "SIR" and insert -- ISR --, therefor.

In column 8, line 66, in Claim 1, after "defining" insert -- a --.

In column 9, line 52, in Claim 13, after "step" delete "of".

In column 10, line 3, in Claim 17, after "using" insert -- an --.

In column 10, line 4, in Claim 17, delete "detection" and insert -- sniffing device --, therefor.

In column 10, line 25, in Claim 20, after "step" delete "of".

In column 10, line 27, in Claim 20, after "register" insert -- (EIRR) --.

In column 10, line 29, in Claim 21, delete "the strobe period has ended" and insert -- strobing has finished --, therefor.

In column 10, lines 31-32, in Claim 22, delete "the strobe period has ended" and insert -- strobing has finished --, therefor.

UNITED STATES PATENT AND TRADEMARK OFFICE
CERTIFICATE OF CORRECTION

PATENT NO. : 7,275,122 B2
APPLICATION NO. : 11/117881
DATED : September 25, 2007
INVENTOR(S) : Randall F. Wright et al.

It is certified that error appears in the above-identified patent and that said Letters Patent is hereby corrected as shown below:

In column 12, lines 26, in Claim 36, delete "occuring" and insert -- occurring --, therefor.

Signed and Sealed this

Twenty-second Day of July, 2008

JON W. DUDAS
*Director of the United States Patent and Trademark Office*